(12) United States Patent
Cordery et al.

(10) Patent No.: US 7,013,024 B2
(45) Date of Patent: Mar. 14, 2006

(54) METHOD FOR READING INFORMATION THAT HAS BEEN EMBEDDED IN AN IMAGE

(75) Inventors: Robert A. Cordery, Danbury, CT (US); Claude Zeller, Monroe, CT (US); Donald G. MacKay, Roxbury, CT (US); William A. Brosseau, Stratford, CT (US)

(73) Assignee: Pitney Bowes Inc., Stamford, CT (US)

( * ) Notice: Subject to any disclaimer, the term of this patent is extended or adjusted under 35 U.S.C. 154(b) by 559 days.

(21) Appl. No.: 10/087,492

(22) Filed: Mar. 1, 2002

(65) Prior Publication Data

US 2003/0002711 A1    Jan. 2, 2003

Related U.S. Application Data

(60) Provisional application No. 60/283,565, filed on Apr. 13, 2001.

(51) Int. Cl.
*G06K 9/00* (2006.01)

(52) U.S. Cl. .............. 382/101; 235/462.09; 235/462.1; 235/462.11

(58) Field of Classification Search ................ 382/100, 382/101; 235/462.01–462.49
See application file for complete search history.

(56) References Cited

U.S. PATENT DOCUMENTS

| | | | |
|---|---|---|---|
| 5,635,694 A * | 6/1997 | Tuhro | 235/375 |
| 5,825,892 A | 10/1998 | Braudaway et al. | |
| 5,829,895 A | 11/1998 | Hayashi et al. | |
| 5,946,414 A | 8/1999 | Cass et al. | |
| 6,102,592 A * | 8/2000 | Herbert | 400/106 |
| 6,317,115 B1 | 11/2001 | Yokomizo | |
| 6,332,194 B1 | 12/2001 | Bloom et al. | |
| 6,359,998 B1 | 3/2002 | Cooklev | |
| 6,415,983 B1 * | 7/2002 | Ulvr et al. | 235/487 |
| 6,611,598 B1 * | 8/2003 | Hayosh | 380/54 |
| 6,636,615 B1 * | 10/2003 | Rhoads et al. | 382/100 |
| 6,768,807 B1 | 7/2004 | Muratani | 382/100 |
| 6,882,442 B1 | 4/2005 | Roberts | 358/1.2 |
| 2001/0022848 A1 * | 9/2001 | Rhoads | 382/100 |
| 2003/0028497 A1 * | 2/2003 | Leon | 705/408 |
| 2004/0190751 A1 | 9/2004 | Rhoads et al. | |

* cited by examiner

*Primary Examiner*—Jingge Wu
*Assistant Examiner*—Craig Kronenthal
(74) *Attorney, Agent, or Firm*—Ronald Reichman; Angelo N. Chaclas

(57) ABSTRACT

A method for detecting a copy of a composite image that includes a first image and a second image that has information embedded in the second image that will change in appearance when the first and second images are scanned or photocopied. The foregoing is accomplished by scanning the first and second images, and detecting a change in appearance of the second image that indicates the first and second images were scanned or photocopied.

12 Claims, 9 Drawing Sheets

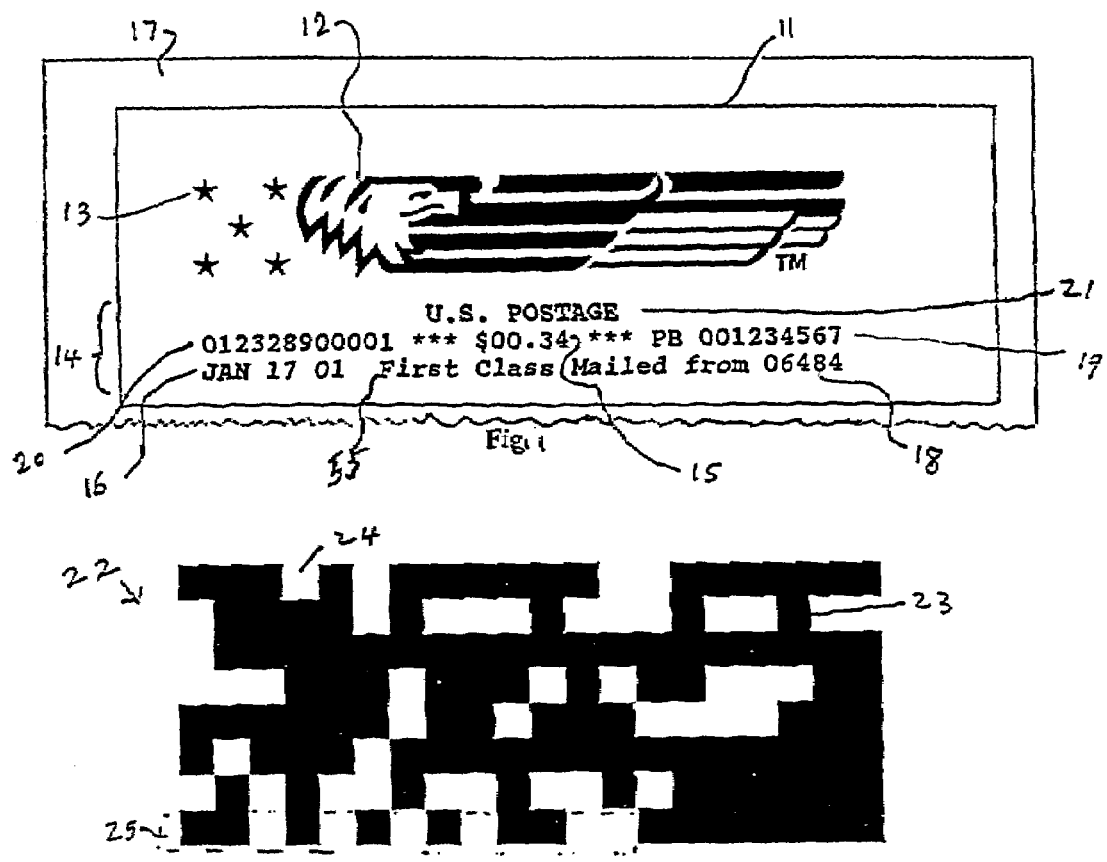
Fig. 1
Fig. 2
Fig. 3

METHOD FOR READING INFORMATION THAT HAS BEEN EMBEDDED IN AN IMAGE

CROSS REFERENCE TO RELATED APPLICATIONS

Reference is made to commonly assigned copending patent application Ser. No. 10/087,518 filed herewith entitled "Method For Embedding Information In An Image" in the names of Claude Zeller, Robert A. Cordery, Donald G. Mackay and William A. Brosseau; and copending patent application Ser. No. 10/087,314 filed herewith entitled "Method For Utilizing A Fragile Watermark For Enhanced Security" in the names of Claude Zeller, Donald G. Mackay, William Kilmartin, William A. Brosseau, James Euchner and Robert A. Cordery Ser. No. 10/087,314) claims the benefit of the filing date of U.S. Provisional Application No. 60/283,565 filed Apr. 13, 2001, which is owned by the assignee of the present Application).

FIELD OF THE INVENTION

The subject invention relates to a method for reading images that contain certain information and, more particularly, to a method that detects when the read images containing certain information are copied.

BACKGROUND OF THE INVENTION

Images such as postal indicia have been printed by postage meters to evidence that the appropriate postage has been affixed to the mailpiece. A typical postal indicia includes fixed elements such as city name, state, a graphic, meter serial number, etc., and variable information such as date, postage amount, an encrypted number, etc. Postal indicia have been printed by flat bed printers and rotary printers without encryption and ink jet printers with encryption. Improved photocopying, printing and scanning equipment have made it easier to commit fraud by copying postal indicia.

Currently, ticketing companies are giving purchasers the option of printing their electronic tickets at home, using ordinary paper, a personal computer printer, and an Internet connection. One of the problems in allowing people to print tickets at home is how to ensure that the tickets are not counterfeited. One of the solutions suggested to solve the foregoing problem is to print an encrypted bar code on the ticket. Unfortunately, a printed ticket on ordinary paper with an encrypted bar code can be photocopied, and the seller of the ticket will be unable to distinguish between the original, genuine ticket and the photocopied ticket.

SUMMARY OF THE INVENTION

This invention overcomes the disadvantages of the prior art by providing a method that makes it more difficult to copy images. The invention provides a method that detects when an image is copied or scanned to reduce the production of fraudulent images. Information in the form of a plurality of numbers and/or characters (in a normal or encrypted form) that represents some fact, i.e., date that an indicia was affixed to a mail piece, zip code, etc., is going to be embedded in an image in a manner that the embedded information will change in appearance when the image is scanned or photocopied.

The foregoing is accomplished by converting the plurality of numbers into a two-dimensional bar code that is repeated m times in the horizontal direction and n times in the vertical direction to produce redundancy so that the two-dimensional bar code will be easier to recover. The two-dimensional bar codes are then filtered by a spread spectrum algorithm that scrambles the information represented by the two-dimensional bar code. Each scrambled two-dimensional bar code will be the same size as the two-dimensional bar code that it replaces. Then each scrambled two-dimensional bar code will be split into two equal parts, i.e., a first part and a second part. Each first part and each second part will contain an upper portion and a lower portion. The upper portion of the first part and the lower portion of the second part will be the same as the respective upper and lower parts of the scrambled two-dimensional bar code. The lower portion of the first part and the upper portion of the second part will be white or empty space. Spread spectrum-like techniques will then be applied to the first part and second part to further hide the information in the first and second parts, and to make it easier to recover the information in the first and second parts. Then the plurality of first and second parts will be expanded over the entire image that is going to be printed. At each location in which information from the plurality of first parts is going to be printed, the printed information will be a printed pixel of a specified dimension, i.e., 2×2 pixels. At each location in which information from the plurality of second parts is going to be printed, the printed information will be a printed pixel of a specified dimension that differs from the pixels printed in the first parts, i.e., 3×3 pixels. The plurality of first and second parts will then be printed over the image to produce an image containing hidden information that is difficult to copy. When the image and plurality of first and second parts are scanned and printed and/or photocopied, the printed pixels of specified dimensions in the first and second parts will become larger. The change in size of the printed pixels of specified dimensions in the first and second parts may be observable by the human eye and/or a scanner. Thus, one will be able to determine when an image is copied.

BRIEF DESCRIPTION OF THE DRAWINGS

FIG. 1 is a drawing of a postal indicia.

FIG. 2 is a drawing of a two-dimensional bar code that represents in coded form the information contained in material 14 and other information.

FIG. 3 is a drawing of portion 25 of bar code 22.

FIG. 9A is a drawing of left half 38 of FIG. 7 divided into section 43 and section 44.

FIG. 9B is a drawing showing the spreading algorithm applied to section 43 of FIG. 9A.

DETAILED DESCRIPTION OF PREFERRED EMBODIMENTS OF THE INVENTION

Figure 4:
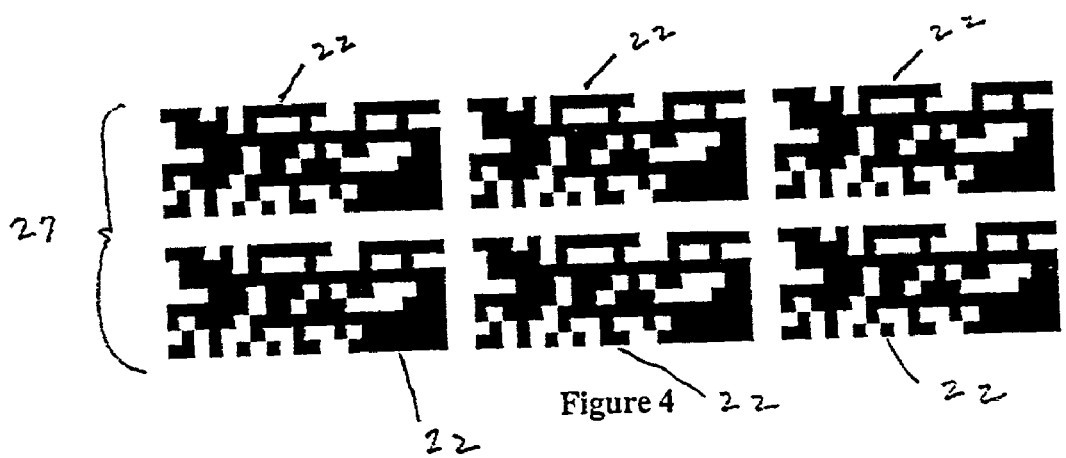
FIG. 4 is a drawing of image 27 consisting of bar code 22 repeated m times in the horizontal direction and n times in the vertical direction.

Referring now to the drawings in detail, and more particularly to FIG. 1, the reference character 11 represents a postal indicia. Postal indicia 11 includes graphic material in the form of an eagle 12 and stars 13 and alphanumeric material 14. Indicia 11 also contains a dollar amount 15; the date 16 that postal indicia 11 was affixed to mail piece 17; the zip code where mail piece 17 was mailed from 18; the postal meter serial number 19; a security code 20; the class of mail 55; and the country 21.

FIG. 2 is a drawing of a two-dimensional bar code 22 that represents in coded form the information contained in material 14 and other information. Bar code 22 comprises a plurality of black modules 23 and white modules 24. Black modules 23 represent a "zero" and white modules 24 represent a "one". Portion 25 of bar code 22 represents the zip code 18 of FIG. 1 with the least significant bit on the left.

FIG. 3 is a drawing of portion 25 of bar code 22. The binary representation of portion 25, i.e., zip code 18, is shown by a plurality of ones and zeros 26.

FIG. 4 is a drawing of image 27 consisting of bar code 22 repeated m times in the horizontal direction and n times in the vertical direction, where m= 3 and n=2. Thus, redundancy is applied by repeating the image of bar code 22 three times in the horizontal direction and two times in the vertical direction.

Figure 5:
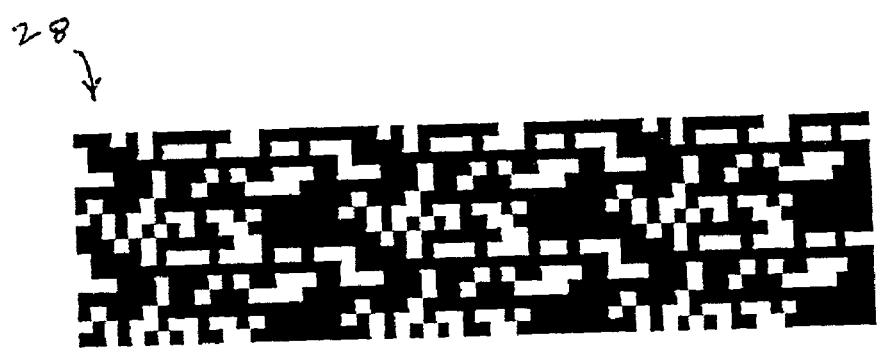
FIG. 5 is a drawing showing the condensing of the six bar codes 22 into one bar code image 28.

FIG. 5 is a drawing showing the condensing of the six bar codes 22 into one bar code image 28.

Figure 6:
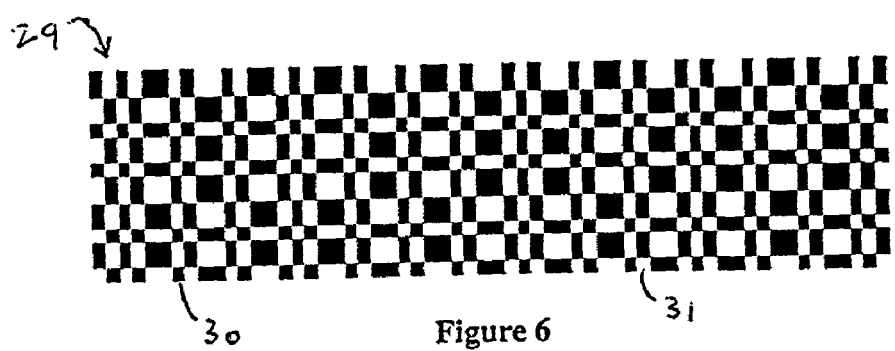
FIG. 6 is a drawing of a mathematical filter 29 that has the same dimensions as bar code image 28 of FIG. 5.

FIG. 6 is a drawing of a mathematical filter 29 that has the same dimensions as bar code image 28 of FIG. 5, i.e., a length of 60 pixels and a width of 16 pixels. Filter 29 may be any arrangement of black pixels 30 and white pixels 31 as long as filter 29 contains the same number of black pixels 30 having a value of "0" and white pixels 31 having a value of "1". Filter 29 may be a pseudo random stream of bits such as the output of a cryptographic algorithm like the Digital Encryption Standard (DES). Alternatively, filter 29 may be an exclusive—or of a function of the X coordinate and a function of the Y coordinate as shown in FIG. 6. Filter 29 causes a pixel-by-pixel exclusive—or reversal—process when it filters an image. Thus, when the pixel of the filter is white there will be a reversal between the image and the calculated filter image; and, when the pixel of the filter is black, there will be no change between the image and the calculated filter image. The following chart shows the calculated filter value for different color image pixels and different color filter pixels.

| COLOR OF PIXEL IMAGE | COLOR OF PIXEL IN FILTER | CALCULATED FILTER IMAGE |
|---|---|---|
| White = 1 | White = 1 | Black = 0 |
| Black = 0 | White = 1 | White = 1 |
| White = 1 | Black = 0 | White = 1 |
| Black = 0 | Black = 0 | Black = 0 |

The filter 29 shown in FIG. 6 is applied to the bar code image 28 shown in FIG. 5 to make the redundant bar code image 28 information invisible. The filter algorithm implementation is a pixel-by-pixel exclusive—or operation—between the image and the filter.

Figure 7:
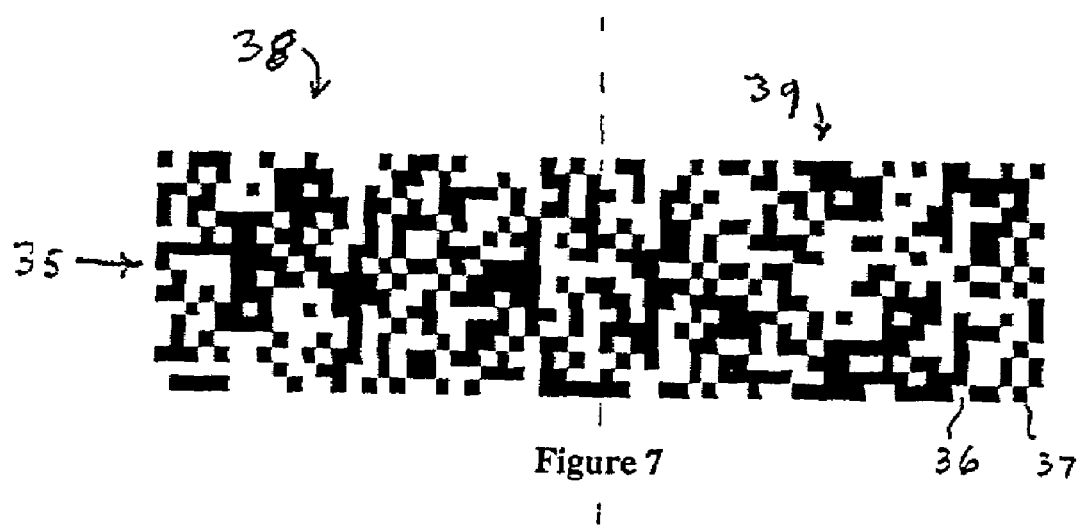
FIG. 7 is the resulting image 35 of bar code image 28 (FIG. 5) filtered by filter 29 (FIG. 6).

FIG. 7 is the resulting image 35 of bar code image 28 (FIG. 5) filtered by filter 29 (FIG. 6). Resulting image 35 is a matrix of sixty horizontal pixels by sixteen vertical pixels that include white pixels 36 and black pixels 37. Image 35 has a left half 38 and a right half 39. The number of pixels in left half 38 equals the number of pixels in right half 39. If one would compare bar code image 28 with resulting image 35, one would observe that bar code image 28 does not correlate with resulting image 35. One would also note that the periodic structure of bar code image 28 is no longer visible in resulting image 35.

Figure 8:
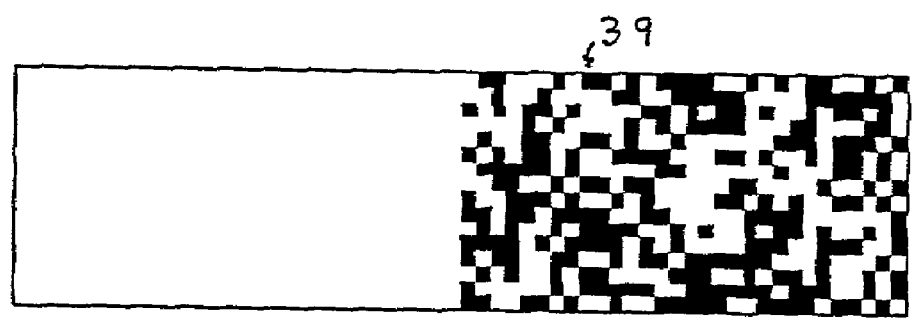
FIG. 8 is a drawing of right half 39 of FIG. 7.

FIG. 8 is a drawing of right half 39 of FIG. 7.

Figure 9:
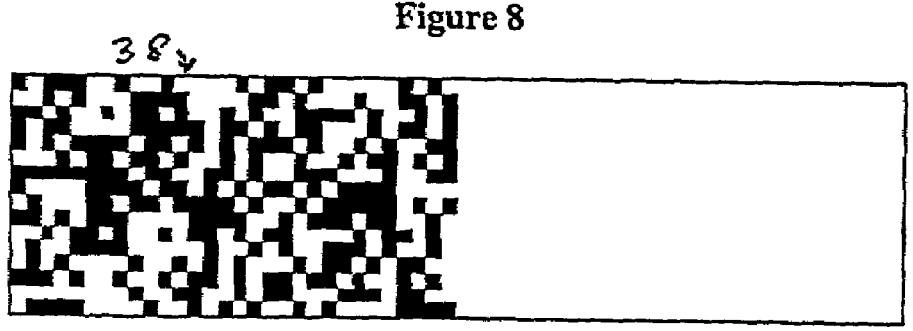
FIG. 9 is a drawing of left half 38 of FIG. 7.
Figure 9:
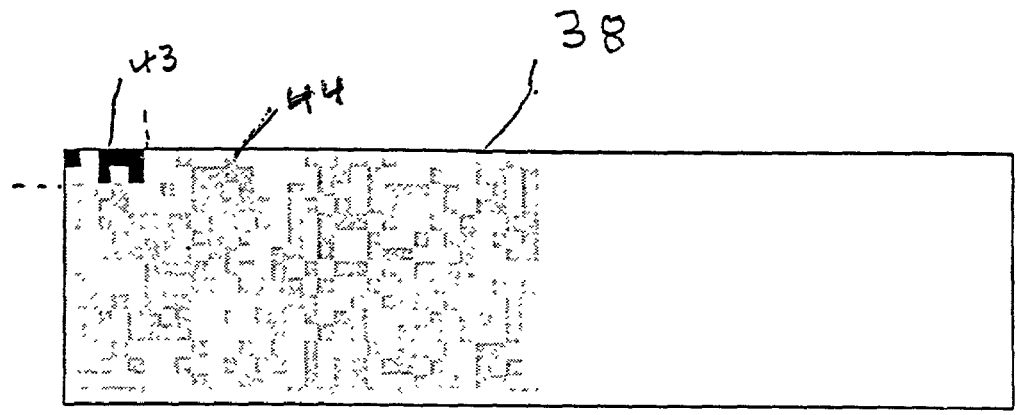
Figure 9:
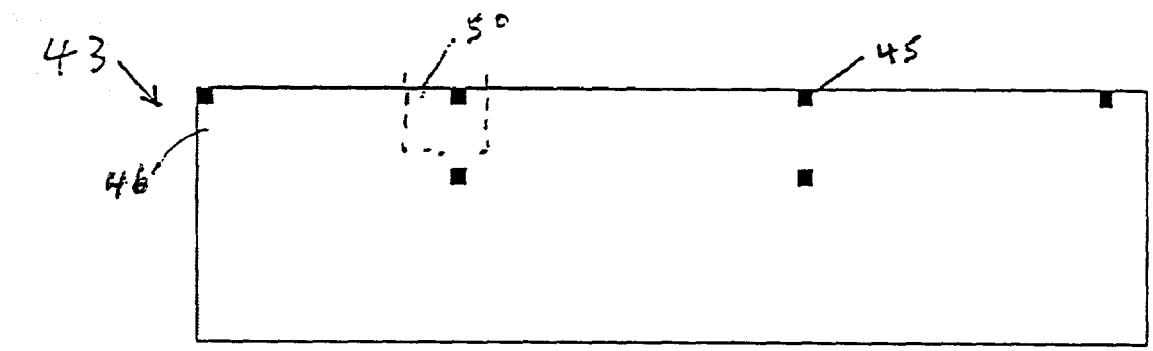

FIG. 9 is a drawing of left half 38 of FIG. 7.

FIG. 9A is a drawing of left half 38 of FIG. 7 divided into section 43 and section 44. Section 43 is shown having black and white pixels. Section 44 is shown having gray and white pixels.

FIG. 9B is a drawing showing the spreading algorithm applied to section 43 of FIG. 9A. The spreading algorithm will be described in the description of FIG. 10. Black pixels are shown at 45, and white pixels are shown at 46. Section 43 has a region 50.

Figure 10:
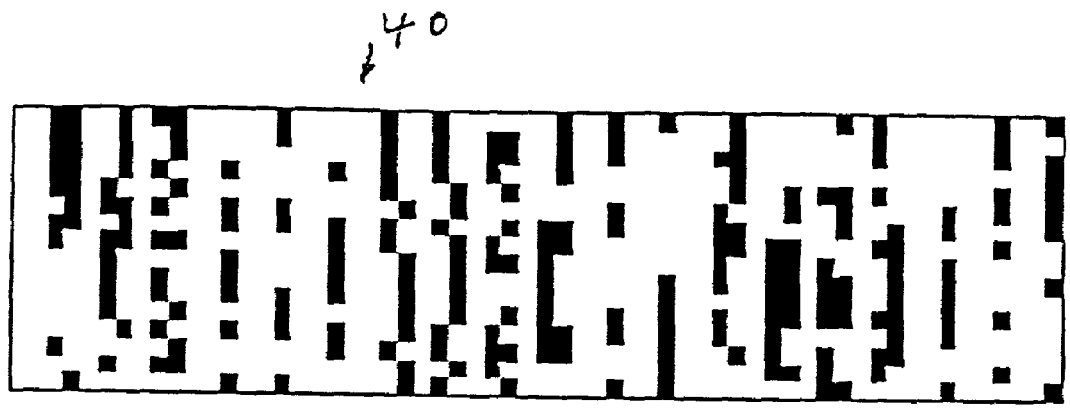
FIG. 10 is a drawing of an image 40 when a spreading algorithm is applied to left half 38.

FIG. 10 is a drawing of an image 40 when a spread spectrum-like algorithm is applied to left half 38. The spreading algorithm is used to increase the hiding capability and optimal recovery of the information hidden in image 40. The spreading algorithm disperses the information, i.e., white pixels and black pixels, in a manner that neighboring pixels in image 38 will not be close together in image 40. In image processing a spreading algorithm essentially transforms an image into another image by randomizing the rows and columns indexes. The following is an example of a spreading algorithm.

$$FIN(NK, KK, k) := \mod\left[KK \cdot \mod\left(k, \text{ceil}\left(\frac{NK}{KK}\right)\right) + \text{floor}\left[\frac{k}{\text{ceil}\left(\frac{NK}{KK}\right)}\right] \cdot \mod\left(KK \cdot \text{ceil}\left(\frac{NK}{KK}\right), NK\right), NK\right]$$

$$INX(NK) := \begin{vmatrix} \text{for } KK \in 1 \ldots NK-1 \\ \quad \text{for } k \in 0 \ldots NK-1 \\ \quad\quad IN_{k,KK} \leftarrow FIN(NK, KK, k) \\ \quad\quad K_k \leftarrow k \\ \quad MN_{KK} \leftarrow \Phi\left(2 \cdot \frac{\text{mean}(IN^{<KK>})}{NK-1} - 1\right) \\ \quad COR_{KK} \leftarrow |corr(IN^{<KK>}, K)| \cdot MN_{KK} + 1 - MN_{KK} \\ COR_0 \leftarrow 1 \\ MIN \leftarrow \min(COR) \\ SKK \leftarrow \overline{[(\Phi(MIN - COR)) \cdot K]} \\ KKO \leftarrow \max(SKK) \\ \text{for } k \in 0 \ldots NK-1 \\ \quad INDX_k \leftarrow FIN(NK, KKO, k) \\ INDX \end{vmatrix}$$

NK is the size of the row or column, and k is the index of the row or column in the original image.

FIN(NK,KK,k) returns a permutation of the index k. The value of KK is chosen to minimize the correlation between the index and the permuted index.

The routine INX(NK) returns the selected permutation INDX.

$INDX_k$ is the chosen permuted index in the spread image.

Figure 11:
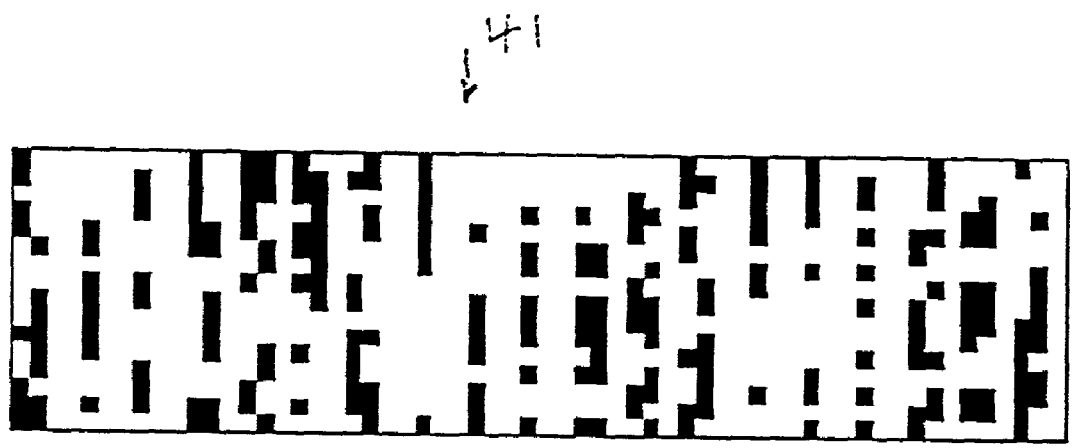
FIG. 11 is a drawing of an image 41 when a spread spectrum-like algorithm is applied to right half 9.

FIG. 11 is a drawing of an image 41 when a spreading algorithm is applied to right half 39. The spreading algorithm is used to increase the hiding capability and optimal recovery of the information hidden in image 41. The spreading algorithm disperses the information, i.e., white pixels and black pixels, in a manner that the neighboring pixels in image 39 will not be close together in image 41. In image processing, a spreading algorithm essentially transforms an image into another image by randomizing the rows and columns indexes. An example of a spreading algorithm is shown in the description of FIG. 10.

Figure 12:
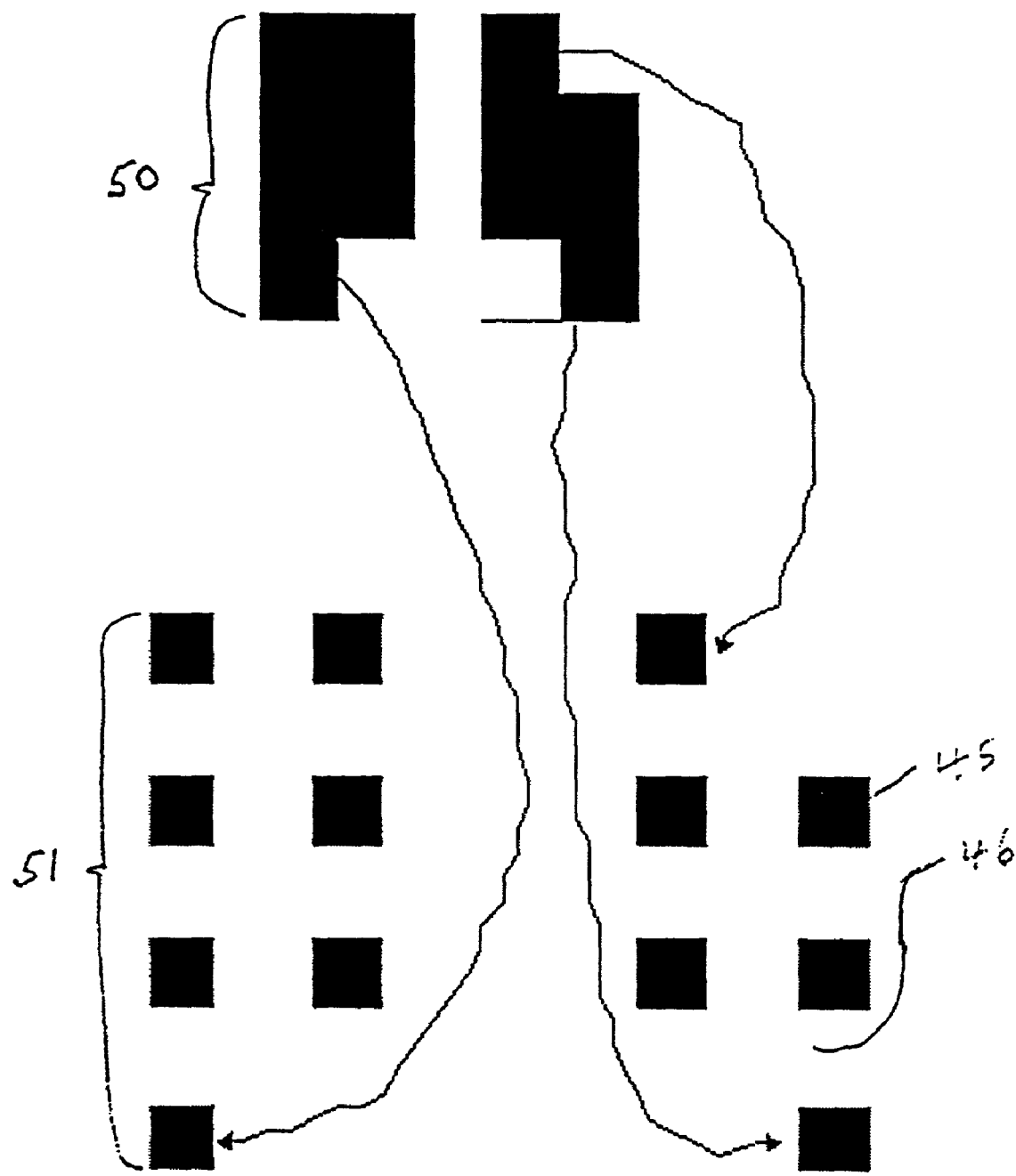
FIG. 12 shows a detailed step of the expansion process.

FIG. 12 is a drawing of an enlarged view of region 50 of section 43, and region 50 expanded into region 51. Black pixels are shown at 45, and white pixels are shown at 46. Two purposes of expanding an image is to control the lightness of the background and to provide a grid to enable a low resolution reading.

Figure 13:
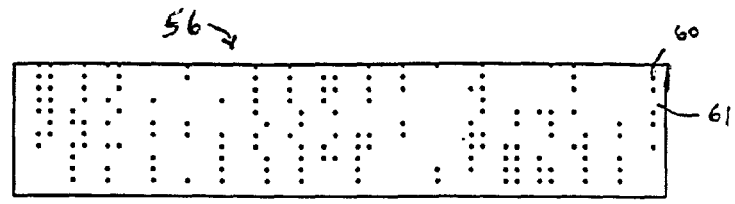
FIG. 13 is a drawing of image 40 expanded to image 56.

FIG. 13 is a drawing of image 40 expanded to image 56. Black pixels are shown at 60, and white pixels are shown at 61. A cluster of 2×2 dots 60 is formed from one black pixel in image 56. No cluster is printed at location 61 to represent a white pixel in image 56.

Figure 14:
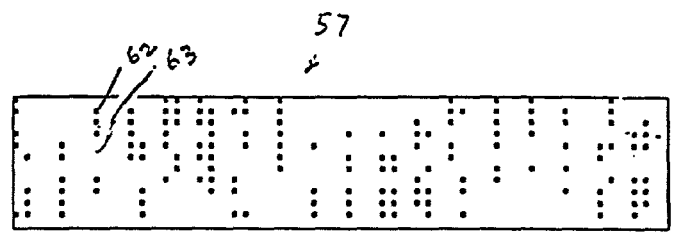
FIG. 14 is a drawing of image 41 expanded to image 57.

FIG. 14 is a drawing of image 41 expanded to image 57. Black pixels are shown at 62, and white pixels are shown at 63. A cluster of 3×3 dots 62 is formed from one black pixel in image 57. No cluster is printed at location 63 to represent a white pixel in image 57. It would be obvious to one skilled in the art that many differently sized and shaped clusters may be used and the sham corners of the clusters removed.

Figure 15:
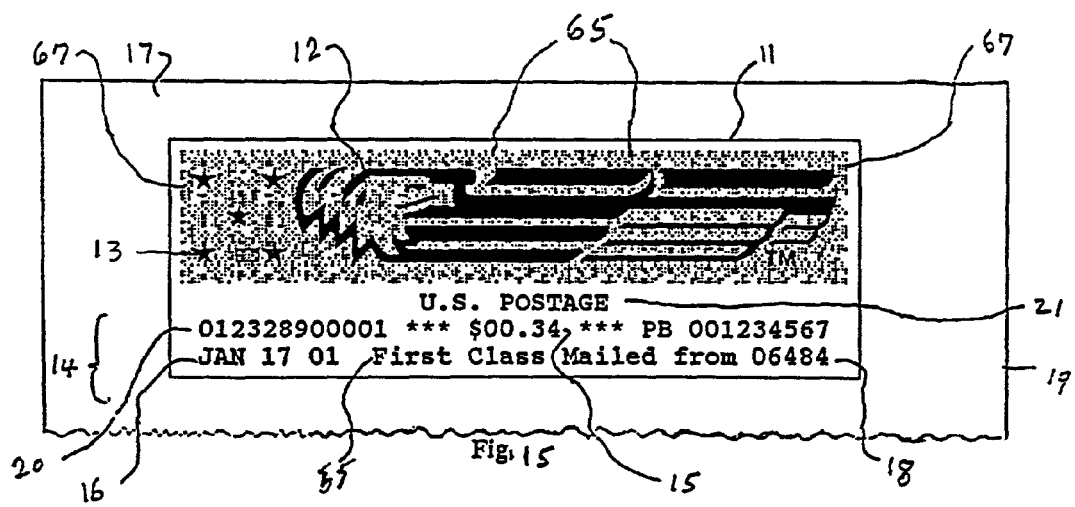
FIG. 15 is a drawing of images 40 and 41 embedded in the graphical material portion of indicia 11 of FIG. 1.

FIG. 15 is a drawing of images 40 and 41 embedded in the graphical material portion of indicia 11 of FIG. 1. Image 40 black pixels are shown at 67, and image 41 black pixels are shown at 65. The manner in which images 40 and 41 change in appearance when they are photocopied, is described in the description of FIG. 17.

Figure 16:
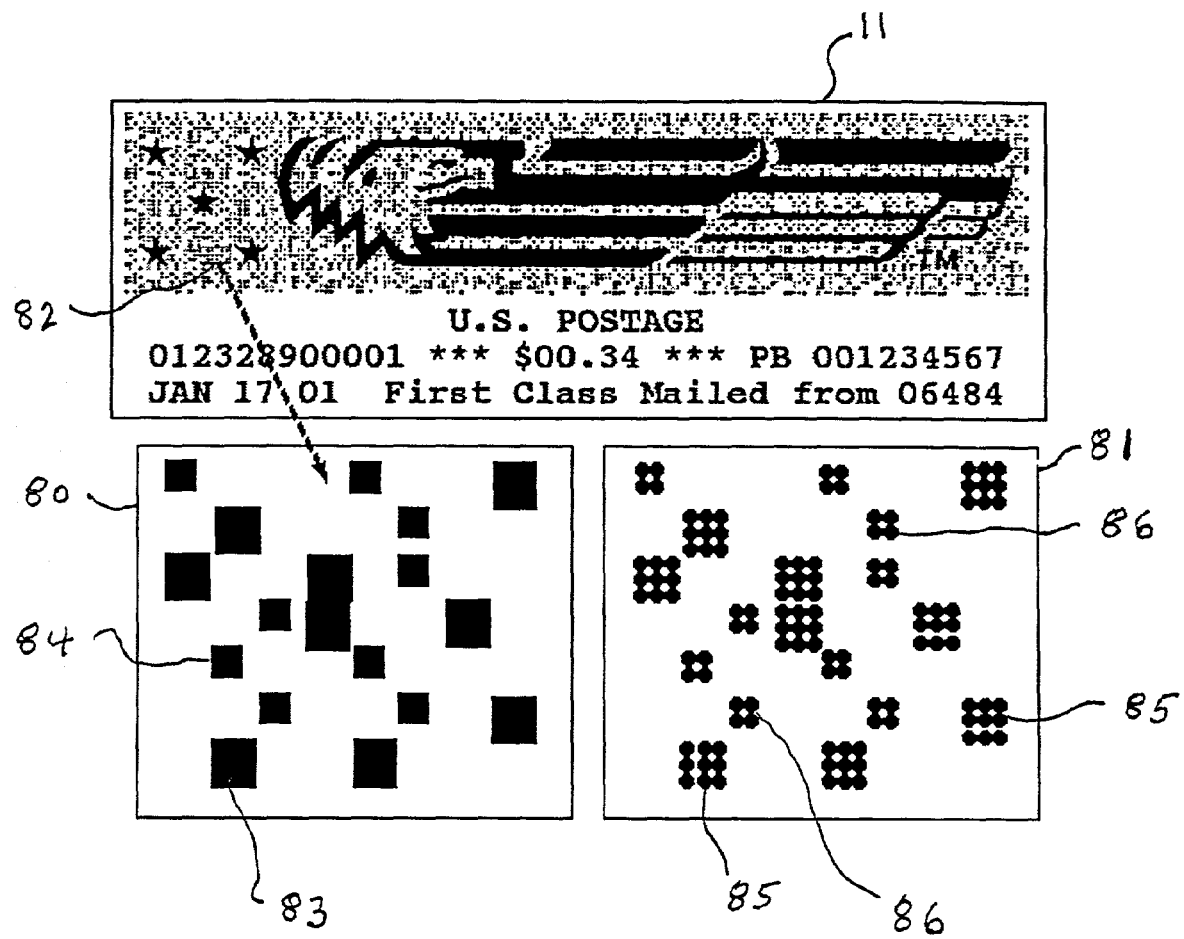
FIG. 16 is a drawing of images 40 and 41 embedded in the graphical material portion of indicia 11 of FIG. 1, details of the bit map of the 3×3 and 2×2 pixels that comprises section 82, and an actual image of 3×3 and 2×2 pixels that comprises bit map 80.

FIG. 16 is a drawing of images 40 and 41 embedded in the graphical material portion of indicia 11 of FIG. 1; details of the bit map of the 3×3 and 2×2 pixels that comprise section 82; and actual image of 3×3 and 2×2 pixels that comprise bit map 80. A bit map 80 and actual scanned image 81 for section 82 are shown for section 82 of indicia 11. Bit map 80 includes 3×3 pixels 83 and 2×2 pixels 84. Actual scanned image 81 includes 3×3 pixels 85 and 2×2 pixels 86.

Figure 17:
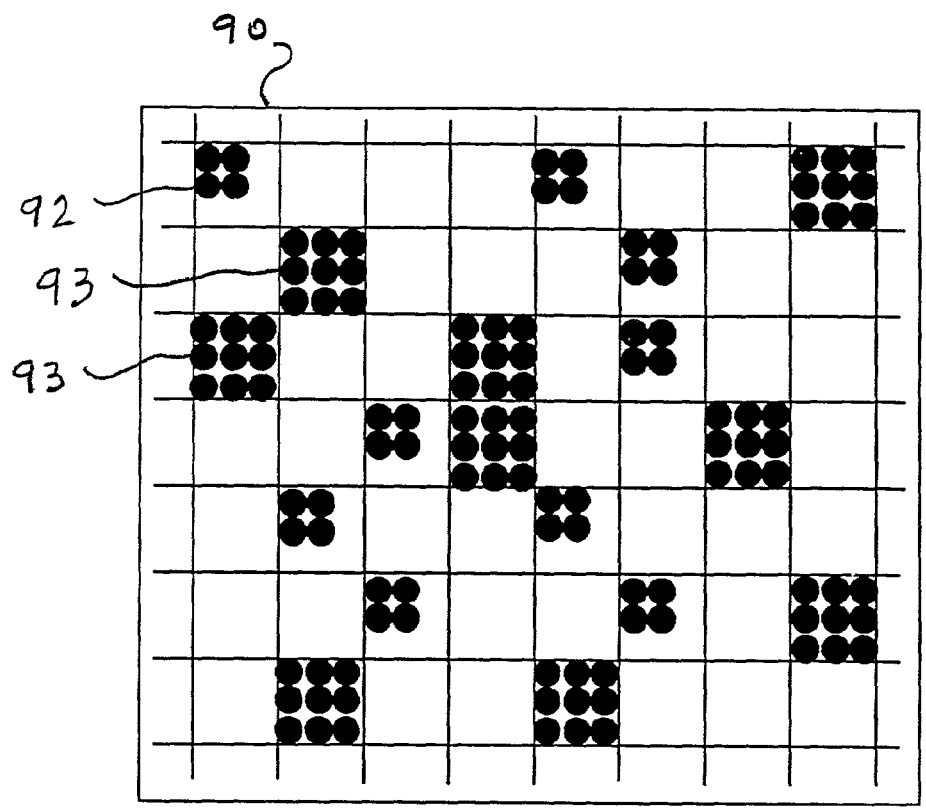
FIG. 17 is a picture 90 of bit map 80 of FIG. 16 and a print 91 of picture 90.
Figure 17:
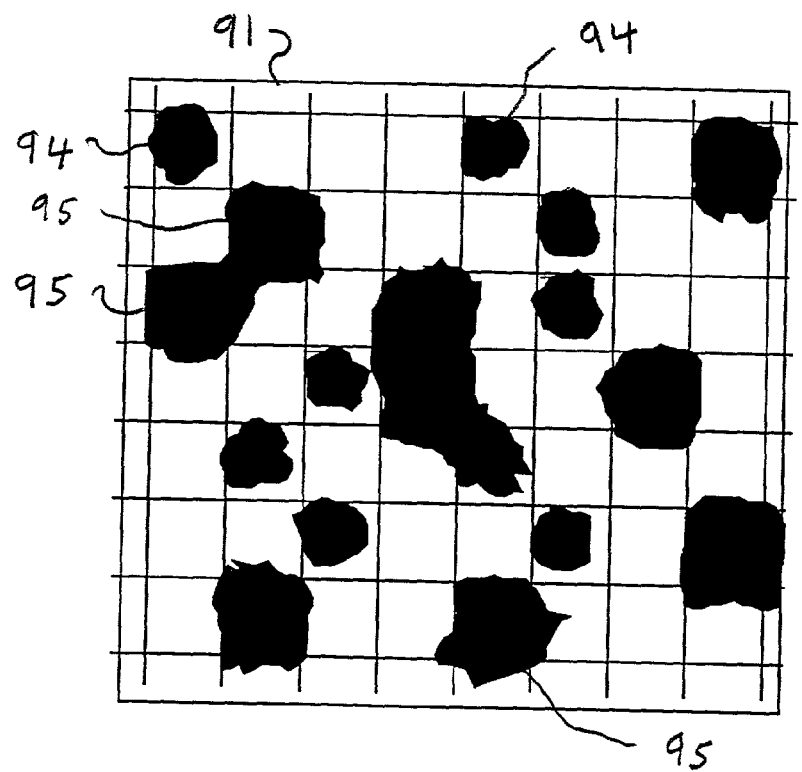

FIG. 17 is a picture 90 of bit map 80 of FIG. 16 and a print 91 of picture 90. Picture 90 shows 2×2 pixels at 92 and 3×3 pixels at 93. Print 91 shows 2×2 pixels 94 and 3×3 pixels 95. The scanning and printing process makes the 2×2 pixels 92 of picture 90 larger than the 2×2 pixels 94 of print 91. By design, the spot size of a printed dot is larger than the pixel spacing to achieve complete coverage in the printed image. Due to ink spread and random ink paper interactions, the spread is not uniform, resulting in shapes that are irregular with blurred and ragged edges. When the print 91 is scanned, the scanner pixel, in general, will not be aligned with the edges of the printed modules. This has the effect of increasing the effective print growth and edge raggedness.

The above specification describes a new and improved method for detecting information that has been embedded in image to determine whether or not the image has been scanned or photocopied. It is realized that the above description may indicate to those skilled in the art additional ways in which the principles of this invention may be used without departing from the spirit. Therefore, it is intended that this invention be limited only by the scope of the appended claims.

What is claimed is:

1. A method for detecting a copy of a composite image that includes a first image and a second image that has information embedded in the second image that will change in appearance when the first and second images are scanned or photocopied, comprising the steps of:

scanning the first and second images, wherein the information contained in the second image is produced by the steps of:

representing the information contained in the second image by a two-dimensional bar code;

filtering the two-dimensional bar code with a spread spectrum algorithm that scrambles the information represented by the two-dimensional bar code;

splitting the filter bar code into an equal first part and an equal second part, wherein each first part and each second part will contain an upper portion and a lower portion such that the lower portion of the first cart and the upper portion of the second part will be white or empty space; and detecting a change in appearance of the second image that indicates the first and second images were scanned or photocopied.

2. The method claimed in claim 1, wherein the first image is a postal indicia.

3. The method claimed in claim 1, wherein the first and second images are printed on a medium.

4. The method claimed in claim 1, wherein:

portions of the area of the second image are larger than portions of the area of the first image.

5. The method claimed in claim 4, wherein portions of the second image have a different shape.

6. The method claimed in claim 5, wherein sharp corners of the second image are removed.

7. The method claimed in claim 1, wherein the first image has a specified bar code module size, and the second image has a specified bar code module size that is different from module size specified for the first image.

8. The method claimed in claim 7, wherein the module size of the bar code in the second image is smaller than the module size of the bar code in the first image.

9. The method claimed in claim 8, wherein the ratio of the area of the second image to the perimeter of the first image is increased from the ratio of the second image to the perimeter of the first image before the image is scanned or photocopied.

10. The method claimed in claim 8, further including the steps of:

decoding information in the first and second images; and determining the amount of information in the original first and second images that is different from the amount of information in the scanned or photocopied first and second images.

11. The method claimed in claim 1, further including the step of:

informing an observer that a copy of the composite image was detected.

12. The method claimed in claim 1, wherein the first image will not change in appearance when the first image is scanned or photocopied.

* * * * *